United States Patent

Rawlings et al.

[11] 3,966,998
[45] June 29, 1976

[54] FEED SUPPLEMENTS FOR RUMINANTS
[75] Inventors: Robert M. Rawlings; Anthony Ambrose Maher, both of Boise, Idaho
[73] Assignee: Blue Wing Corporation, Boise, Idaho
[22] Filed: June 19, 1974
[21] Appl. No.: 480,850

[52] U.S. Cl. .............................. 426/630; 426/632; 426/634; 426/656; 426/807
[51] Int. Cl.² ........................................... A23K 1/00
[58] Field of Search ............ 426/93, 96, 147, 210, 426/285, 289, 309, 374, 468, 807, 2, 89, 98, 276, 630, 635, 656, 516, 632, 601; 264/53

[56] References Cited
UNITED STATES PATENTS

| | | | |
|---|---|---|---|
| 3,434,843 | 3/1969 | Durst | 426/98 |
| 3,619,200 | 11/1971 | Ferguson et al. | 426/96 X |
| 3,786,123 | 1/1974 | Katzen | 426/807 X |

FOREIGN PATENTS OR APPLICATIONS 1,337,749  11/1973  United Kingdom

OTHER PUBLICATIONS
N. O. Simmons, Feed Milling and Associated Products," Leonard Hill Books Ltd., London, 1963, p. 18.

Primary Examiner—Raymond N. Jones
Assistant Examiner—R. A. Yoncoskie
Attorney, Agent, or Firm—Richards, Harris and Medlock

[57] ABSTRACT

A novel feed supplement for ruminants containing lipids which are dispersed within a protective protein-aldehyde complex is provided. The protective protein-aldehyde complex which is substantially insoluble in the rumen but soluble in the abomasum and lower gut of a ruminant, protects the dispersed lipids from breakdown within the rumen. The feed supplement is produced by a process wherein a protein and lipid mixture is contacted with a sufficient quantity of an aldehyde, while being subjected to higher than atmospheric pressure and elevated temperatures during an admixing and comminuting operation such as within an extruder, to form the protective protein-aldehyde complex. The material, when extruded in an agglomerated form, produces a feed supplement for ruminants.

16 Claims, 2 Drawing Figures

FEED SUPPLEMENTS FOR RUMINANTS

This invention relates to feed supplements for ruminants. In another aspect, this invention relates to feed supplements for ruminants containing relatively high quantities of lipids which are protected from breakdown within the rumen but may be effectively assimilated in the abomasum and lower gut and thus, beneficially utilized by the animal. In a further aspect, this invention relates to a novel feed supplement and a process for making same which contains relatively high quantities of lipids in discrete globules which are dispersed within a protective protein-aldehyde complex.

The milk, meat and meat by-products obtained from ruminants such as cows and sheep contain fat which is completely hydrogenated being known commonly as saturated fat. Such milk, meat and meat by-products constitute a large portion of the human diet. However, modern medicine has determined that assimilation of saturated fats by humans is detrimental to their health. Specifically, arterial and coronary diseases are believed directly associated with the level of saturated fat in the human diet. Ruminant milk, meat and meat by-products containing polyunsaturated fat would therefore be desirable.

Seeking to accomplish this end, ruminants have been fed high concentrations of unsaturated lipids but such attempts were unsuccessful. The animals became infirm, having severe gastric disturbances and a loss of appetite. Additionally, most all of the unsaturated lipids ingested by the animals were assimilated as saturated fat.

The ruminant animal has a multi-gastric system with a first stomach called a rumen where bacteria known generally as microflora are present. These bacteria have the ability to break down protein and to hydrogenate unsaturated lipids. Therefore, a significant portion of the unsaturated lipids contained in ruminant feed are hydrogenated in the rumen by the microflora and assimilated by the animal as saturated fat. Additionally, the rumen apparently has a low tolerance to feeds containing high concentrations of saturated or unsaturated lipids. This low tolerance produces severe gastric process imbalance when feeds containing high concentrations of lipids (approximately 8% or more) are ingested. Feeding high concentrations of lipids therefore is deleterious to the level of meat and milk production normally experienced in feeding ruminants lower concentrations of lipids.

Recently, a process has been developed to encapsulate lipids in a protective protein-aldehyde complex coating. This protein-aldehyde coating is not susceptible to breakdown in the rumen but is susceptible to breakdown in the abomasum and lower gut. This process includes finely dividing a lipid material into discrete particles or globules and forming an aqueous emulsion of the finely divided lipid and a proteinaceous material. The aqueous emulsion can then be reacted with an aldehyde such that the finely divided lipid particles are encapsulated in a proteinaldehyde complex. The emulsion can be spray dried or otherwise processed prior to the aldehyde addition or thereafter to form a coated particulate solid.

The disadvantages of such a process are cost and preparation time. Specifically, the lipid material must be finely ground prior to the formation of an aqueous emulsion. The emulsion must also be dried when, as in most cases, a solid feed is desired. Such a process involves expensive grinders, emulsification equipment and drying apparatus, in addition to energy required to dehydrate the emulsion.

According to the invention, a novel feed supplement for ruminants containing relatively high quantities of lipids which are protected from breakdown in the rumen but may be effectively assimilated in the abomasium and lower gut, is provided by contacting a previously formed mixture of lipid and protein material with an aldehyde while the mixture is being finely comminuted and further admixed at a pressure greater than that of atmospheric pressure and at elevated temperatures. The comminuting operation thoroughly disperses the lipids in the form of lipid globules within the protein material which, upon being contacted with the aldehyde, forms the protective proteinaldehyde complex containing the encapsulated discrete lipid globules therein.

Preferably, the contacting is accomplished in the presence of an activating agent such as an alkali metal hydroxide urea or anhydrous ammonia to first activate the protein material prior to formation of the protein-aldehyde complex.

According to the invention, the above process is preferably accomplished by augering the material under progressively increasing pressures, for example, in an extruder. The increased pressure combined with a temperature elevation, due to frictional heat generated by augering the material within the extruder, provides the proper reaction conditions to form the feed supplement of the subject invention.

In accordance with the preferred embodiment of the subject invention, the protein material and the lipid are both supplied from an oil seed. The oil seed is initially comminuted to approximately uniform particulate size and is then contacted with an aldehyde, in the presence of a protein activating agent, as the seed material is augered through the barrel of an extruder under increasing pressure and at elevated temperatures. The resultant material which is emitted from the extruder is agglomerated and may be used directly as a feed supplement.

Generally, the novel process of the subject invention can be utilized to produce a ruminant feed supplement containing a protein-aldehyde complex which is substantially insoluble in the rumen but soluble in the abomasum and lower gut of the ruminant. Such protein-aldehyde complex will protect lipids dispersed therein from degradation in the rumen but allow digestion of the lipid within the abomasum and lower gut of the animal. The feed supplement manufactured in accordance with the instant invention can thus be utilized to increase ruminant assimilation of a lipid or lipid soluble material which can be chosen for a particular use, i.e., to increase the polyunsaturated lipids within the milk, meat and meat by-products of the ruminant; to increase the quantity of lipids which can be effectively utilized as a high energy source of nutrients and/or to carry lipid soluble medicaments, vitamins, modifiers or the like.

The lipids that can be used within the scope of the instant invention may be either those found naturally occurring in living tissue or those which have, in some manner, been synthetically produced. The so-called fatty acids are one such naturally occurring lipid which can be effectively protected. Either the saturated or unsaturated fatty acids which are normally found in living tissue and readily available substances which may be utilized as the lipid component of the subject invention. For instance, where it is desired to increase the proportion of polyunsaturated fat assimilated by the ruminant, polyunsaturated vegetable and/or animal fats or oils can be utilized. Examples of suitable such materials include vegetable oils derived from soybean, peanut, sunflower, safflower, cotton seed, maize, rape and the like; and animal fats or oils derived from non-ruminants such as fish, fowl and pigs.

Additionally, lipid soluble, protein, vitamins and medicines of various types and/or other materials such as flavoring agents, anti-oxidants, texturing agents, which are lipid soluble, can be incorporated into the lipid component to be protected.

The protein material that can be used in the scope of the instant invention may be any polymeric assemblage of amino groups and amino acids by peptide linkage. Both the crosslinked and the non-crosslinked chains can be used. Any protein which is generally known by name in accordance with the presence and sequential order of the amino acid units in the polymeric chain may be utilized. The identity and arrangement of the constituent amino acid units is largely immaterial and the essential requirement is that the polymeric structure include $NH_2$ groups. Such $NH_2$ groups are acted upon by the aldehyde to form covalent crosslinking between one amino acid chain and the other. Examples of suitable such proteins include animal protein such as cassein, gelatin and protein material obtained from fish. Plant protein such as gluten may also be utilized.

In accordance with the instant invention, the lipid and protein should be combined in quantities such that the resultant mixture has a lipid-to-protein ratio in the range of from about 0.5:1 to about 5:1 by weight.

In accordance with the preferred embodiment of the subject invention, the lipid and the protein material both naturally occur in an oil seed. Generally, any seed containing quantities of lipids which are preferably unsaturated and more preferably, polyunsaturated, can be used within the scope of the subject invention. Such seeds are generally known as oil seeds. Any oil seed, for example, sunflower, safflower, peanut, soybean, cotton, maize, rape and the like can be used. There is no known oil seed which cannot be used within the scope of the subject invention.

When assimilation by the ruminant of polyunsaturated lipids is desired, oil seeds containing polyunsaturated lipids may be chosen. The type of polyunsaturated lipid material contained in the oil seed utilized will depend upon the variety of seed. However, linoleic acid and linolenic acid are known prevalent in almost all whole oil seeds. These acids, along with arachidonic acid, comprise the so-called essential fatty acids. The essential fatty acids are known to be required in the metabolism and degradation of cholesterol in the human body. Linoleic acid is a straight chain molecule having the formula $C_{17}H_{31}COOH$ with double bonds between carbon atoms 9 and 10, and 12 and 13. Linolenic acid is a straight chain molecule having the formula $C_{17}H_{29}COOH$ with double bonds between carbons 9 and 10, 12 and 13, and 15 and 16. Additionally, oil seeds may contain monounsaturated, saturated, and other polyunsaturated lipids within the seed's protein material.

The oil seed utilized may therefore be chosen according to the percentage of one or more of the lipids naturally present therein. A mixture of such seeds can also be utilized.

The aldehyde utilized in forming protein-aldehyde complex can be any hydrocarbon containing at least one aldehyde group thereon as long as the remaining groups do not interfere with the reaction between the CHO and the activated protein. Further, the aldehyde may be in nonvaporous form, for example, a solid, liquid or a solution so long as the solvent used does not interfere with reaction of the protein material with the aldehyde. Based upon availability, a preferred group of nonvaporous aldehydes is gluteraldehyde, glyoxal and paraformaldehyde. The most preferred nonvaporous aldehyde is paraformaldehyde. The vaporous aldehyde may be in gaseous or aqueous vapor form, for example, the vapors of an aqueous solution of paraformaldehyde. The most preferred gaseous aldehyde is formaldehyde.

The amount of aldehyde utilized in accordance with the present invention will depend upon the amount of protein initially present in the protein material-lipid mixture. Generally, sufficient CHO must contact the proteinaceous material such that the protective protein-aldehyde complex formed is substantially insoluble at pH levels greater than about 5 and substantially soluble at pH levels less than about 4. The solubility characteristics are required to make sure that the protein-aldehyde complex is resistant to degradation in the rumen but susceptible to such degradation in the abomasum and lower gut. About 4% to about 15% by weight and preferably, about 10% by weight of a nonvaporous aldehyde per total weight of protein in the protein material-lipid mixture is generally sufficient. In using a gaseous aldehyde, about 1% to about 5% by weight and preferably, about 3% by weight of aldehyde per total weight of protein is sufficient.

The nonvaporous activating agent that can be utilized within the scope of the present invention can be an alkali metal or ammonium hydroxides or urea in either solid or liquid form. Additionally, the activating agent may be dissolved in a convenient solvent, for example, water, as long as the presence of the solvent does not interfere with either the protein activation or reaction with aldehyde. Based upon availability, the preferred alkali metal hydroxide is solid sodium hydroxide. The preferred urea is prilled urea.

The amount of nonvaporous activating agent utilized as a sole activating agent is from about 1% to 5% nonvaporous activating agent per total weight of protein material-lipid mixture and preferably, about 3% of nonvaporous activating agent per total weight of mixture.

When anhydrous ammonia is utilized as the sole activating agent, anhydrous ammonia is passed into the protein material-lipid mixture under sufficient pressure to sufficiently contact the proteinaceous material to be activated, for example, 20 psig to 40 psig and in amounts from about 1% to about 5% by weight of anhydrous ammonia per total weight of protein material-lipid mixture and preferably, about 3% by weight anhydrous ammonia per total weight of mixture.

The admixing and comminuting of the various ingredients may be carried out in any suitable reactor means which also provides the proper temperature and pressure conditions for the reaction of the activating agent and/or the aldehyde. Such reactor means should be capable of maintaining the material being comminuted and admixed at temperatures from about ambient to about 250°F and pressures of from about 5 psig to about 50 psig. A suitable reactor means can be an extruder device which is disclosed in U.S. Pat. No. 3,765,319.

Generally, to facilitate the reaction, it is preferred that the mixture contain from about 4% to about 20% by weight water, when passed into the extruder to be finely comminuted and admixed. When utilizing a protein material-lipid mixture, the moisture may be added directly to the mixture prior to augering through the extruder.

Thus, according to the subject invention, effective amounts of an aldehyde and preferably, an activating agent, are contacted with a mixture of moist lipid and protein material which is being finely comminuted and mixed under sufficient pressure to prevent removal of vaporized constituents and under an elevated temperature sufficient to allow reaction of the constituents.

This invention can be more easily understood from the study of the drawings in which.

Figure 1:
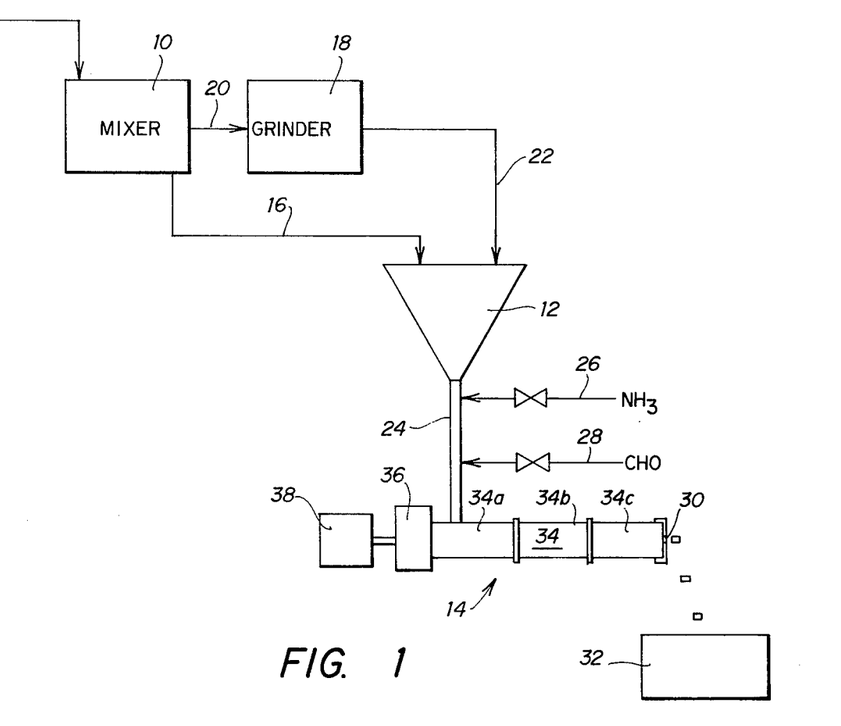
FIG. 1 is a schematic flow diagram of the preferred process of the subject invention.

Referring now to the drawings and more particularly to FIG. 1, a schematic illustration of a novel process for producing the feed supplement of the subject invention is shown. Initially, a protein material-lipid mixture, together with a nonvaporous activating agent and/or a nonvaporous aldehyde is passed into mixer 10 wherein the various constituents are uniformly admixed and blended. Mixer 10 can be any type of mixer known in the art, such as a stirrer, a mechanical paddle, mixer or the like. Next, if the resulting mixture in mixer 10 has a particulate size of less than about 3/32 inch, it can be passed directly to hopper 12 of extruder 14 through a suitable delivery means, such as by conduit 16. If, however, the mixture is of a larger particle size or contains oil seed as one constituent, then the mixture is passed to a grinder 18 through a suitable delivery means such as conduit 20. Grinder 18 can be any suitable grinder known in the art such as a hammer mill or a rotary grinder and the like. The preground material is then passed from grinder 18 to hopper 12 through a delivery means such as conduit 22.

Hopper 12 communicates with the tail of the barrel of extruder 14 via a feeder conduit means 24. Vaporous reactants can be passed into feeder conduit 24 as the sole reactants or in addition to nonvaporous reactants already present in the mixture. The vaporous reactants are admixed with the material passing to extruder 14. For example, when ammonia is to be used as an activating agent, if passes via ammonia delivery conduit 26 which is in communication with feeder conduit 24. When a vaporous aldehyde, such as formaldehyde is to be used, it passes via conduit 28, which is also in communication with feeder conduit 24. The material passing through feeder conduit 24, which comprises a protein material, a lipid, an activating agent and an aldehyde is subjected to a comminuting and admixing operation within extruder 14 wherein the material is compressed and ground under pressure of about 5 psig to 50 psig. The grinding and compressing is accomplished by a rotating screw which passes through a steam lock means. In addition, this action results in a temperature rise in the range from about 75°F. to about 250°F. due to frictional forces applied to the material as it passes through the extruder. The grinding and compressing action with the resultant heat and pressure uniformly distributes the lipid globules within a protein material matrix. Additionally, the activating agent is reacting with the protein material which in turn is reacted with the aldehyde to form the protein-aldehyde complex containing encapsulated lipid globules. The resultant material is extruded through outlet 30 of extruder 14 in agglomerated form and is broken into chunks by gravitational forces acting thereon. The pellets or agglomerated particles are collected within a collection bin 32.

As set forth above, extruder 14 can be any suitable mechanism known in the art which will compress and grind the protein material-lipid mixture to form a uniform distribution of lipid globules within a protein material matrix as well as impart a sufficient reaction pressure and temperature to first activate the protein material by reaction with the activating agent and subsequently react the activated protein material with an aldehyde. Reaction temperatures in the range of from about 75°F. to about 250°F. and pressures sufficient to enable vaporous materials to uniformly contact the mixture and prevent escape of any of the vaporized reactants is adequate to produce the feed supplement. A suitable such mechanism is disclosed in U.S. Pat. No. 3,765,319 which patent is herein incorporated by reference into the subject application.

Extruder 14 basically comprises an articulated housing 34 which contains a screw auger having its end section suitably mounted in bearings for rotation within housing 36, and having a terminal portion connected to a drive mechanism 38 which supplies rotating motion thereto.

Figure 2:
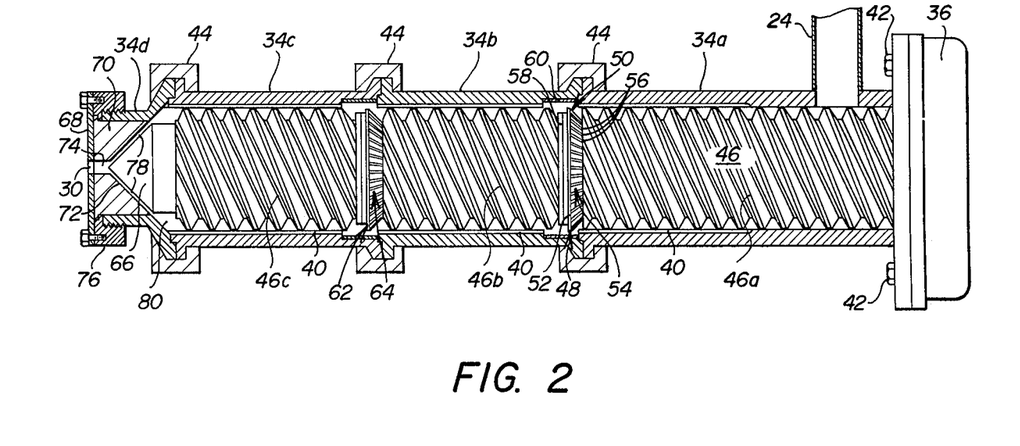
FIG. 2 is a sectional view of a preferred extruder apparatus which is utilized in the scope of the subject invention.

Now referring to FIG. 2, the interior of the articulated housing will be described in detail. It should be noted that extruder 14 is depicted as having three sections comprising a rear, an intermediate and a front section. This number of sections is set forth as a preferred embodiment. Extruders that can be used in the scope of the invention may contain more or less of such sections providing the parameters of temperature and pressure are otherwise maintained. As shown, articulated housing 34 comprises a rear section 34a, an intermediate section 34b and a front section 34c. Each of the sections 34a, 34b and 34c carries on its innerperipheral surface, a series of axially extended circumferentially spaced grooves 40. The grooves 40 in each of the sections 34a, 34b and 34c are aligned axially of articulated housing 34. The rear section 34a and housing 36 are fastened together by bolts 42. Split ring clamps 44 connect intermediate section 34b with rear section 34a and front section 34c, and front section 34c with nose section 34d as shown. Auger 46 is comprised of a rear section 46a, an intermediate section 46b and a front section 46c and is positioned axially within articulated housing 34. Specifically, rear section 46a of auger 46 is positioned within rear section 34a; intermediate section 46b of auger 46 is positioned within intermediate section 34b of articulated housing 34 and front section 46c of auger 46 is positioned within front section 34c of articulated housing 34.

Steam lock assembly 48 is positioned between rear auger section 46a and intermediate auger section 46b. Steam lock assembly 48 includes a frusto-conical ring 50 formed with a land section 52 and a rearwardly and inwardly tapered surface 54 formed with a series of circumferentially spaced grooves 56. The land section 52 is spaced from auger section 46b by a continuous indentation or spacer segment 58. Sleeve 60 is inset in the intermediate housing section 34b and extends in a concentrically spaced relation about frusto-conical ring 50. The innerperipheral surface of sleeve 60 is substantially continuous with the bottom wall surfaces of grooves 40.

A steam lock assembly 62 is located between auger sections 46b and 46c and is similar in construction to the steam lock assembly 48 except that frusto-conical ring member 64 is larger in diameter than frusto-conical ring 50. Similar reference numerals are, therefore, used to designate like parts in steam lock assemblies 48 and 62.

Cone member 66 is fixedly attached in axial alignment with the end of auger section 46c. Nose section 34d comprises a die head assembly 68 and a cylindrical member 70 carrying a cone shaped cavity 72 adapted to receive in mating engagement cone section 66. Discharge bore 74 communicates with outlet 30 and extends axially through cylindrical member 70. The apex of cone section 66 extends within discharge bore 74 when cone section 66 is in mating engagement within cone shaped cavity 72.

Adjustment of cylindrical member 70 relative to nose section 34d and in turn relative to cone section 66 is accomplished by means of a ring member 76 circumferentially disposed about the forward end of the housing of nose section 34d. On rotational adjustment of ring member 76, relative to the housing nose section 34d, cylindrical member 70 is moved axially relative to cone section 66 so as to vary the spacing between the adjacent complementary surfaces of cone section 66 and cavity 72. By rotating ring member 76, the transverse cross-sectional area of the passage 78 formed between the external surface of cone section 66 and the sidewall surface of cavity 72 may be adjusted. The volume of passage 78 is thus expandable and contractable in direct response to a rotational adjustment of ring member 76.

A portion of the base of cone section 66 is cut away to form within the adjacent part of the inner surface of the housing nose section 34d, a circumferentially extended connecting passage 80. It is noted that the clearance between the outer periphery of the auger 46 and the interior of housing 34 is on the order of 0.094 inches. Furthermore, the steam lock assembly 48 has a clearance relation between land section 52 and its associated wear sleeve 60 of about 0.125 inches. The corresponding clearance in steam lock assembly 62 is about 0.0625 inches.

In accordance with the preferred embodiment of the invention wherein a whole oil seed is used, such seeds contain natural moisture in amounts from about 5% to about 30% by weight. Seeds, prior to entering mixer 10, are preferably brought into intimate contact with a moist atmosphere of, for example, about 90% to 100% humidity to add moisture to the seeds. Such moisture addition is particularly preferred when seeds to be used contain less than about 12% by weight natural moisture or such moisture will subsequently be lost to the atmosphere in, for example, the comminuting operation.

When a nonvaporous activating agent and/or a nonvaporous aldehyde are to be used, the whole oil seed, the activating agent and/or the aldehyde are initially admixed in mixer 10 and subsequently ground in grinder 18. When a vaporous activating agent and a vaporous aldehyde are the only such reactants to be used, the mixing step is not required and the whole oil seed alone may be fed directly to grinder 18. Within grinder 18, the mixture containing whole oil seed or the whole oil seed alone, is ground to a particulate size of from about 1/32 inch to about 5/32 inch and more preferably, about 3/32 inch. In order to assure uniform particulate size, the material ground within grinder 18 is preferably screened prior to entering hopper 12.

When a nonvaporous activating agent is utilized in accordance with the preferred embodiment, the amounts used will vary according to the activating agent used. When sodium hydroxide is utilized as the sole activating agent, about 1% to about 4% sodium hydroxide per total weight of seed and preferably, about 2% sodium hydroxide per total weight of seed is used. When prilled urea is utilized as the sole activating agent, the amount used is from about 2% by weight to about 4% by weight of prilled urea per total weight of seed and preferably, about 3% by weight of prilled urea per total weight of seed. When sodium hydroxide and urea are used simultaneously, but no vaporous activating agent is used, then the amount will vary depending upon the ratio of the proportion of each. For example, when used in equal proportions, the mixture of activating agents will be from about ½% by weight to about 2% by weight sodium hydroxide and about ½% by weight to about 2% by weight of prilled urea per total weight of seed and preferably, about 1% by weight of sodium hydroxide and 1.5% by weight of prilled urea per total weight of seed.

When anhydrous ammonia is utilized as an activating agent, either solely or in conjunction with another nonvaporous activating agent, it is contacted with the mixture present in feeder conduit 24 by passing the anhydrous ammonia through delivery conduit 26. When used as the sole activating agent, anhydrous ammonia is passed into the ground material within feeder conduit 24 under sufficient pressure to intimately contact the proteinaceous material to be activated, for example, 20 psig to 40 psig in amounts from about 1% to about 6% by weight of anhydrous ammonia per total weight of seed and preferably, 2% by weight anhydrous ammonia per total weight of seed. In using any combination of a nonvaporous activating agent and anhydrous ammonia, the appropriate mole equivalents in proportion to weight of activating agent per total weight of seed as described above may be utilized.

The amount of aldehyde utilized in accordance with the preferred embodiment depends upon the amount of protein initially present in the whole oil seed. Most seeds contain from about 10% to about 40% by weight, protein. When paraformaldehyde is the sole aldehyde used, about 8% to about 12% by weight and preferably, about 10% by weight of paraformaldehyde per total weight of protein in the whole oil seed is generally sufficient to form the protective aldehyde complex.

When a gaseous aldehyde is utilized as the sole aldehyde, it is passed via conduit 28 into the material within feeder conduit 24. The vaporous aldehyde, for example, formaldehyde, is passed into the material under sufficient pressure to sufficiently contact the activated proteinaceous material, for example, 20 psig to 40 psig, and is used in amounts from about 1% to about 6% by weight and preferably, about 2% by weight of formaldehyde per total weight of protein in the whole oil seed. In using any combination of nonvaporous aldehyde and a vaporous aldehyde, the appropriate mole equivalents in proportion to the weight of aldehyde per total weight of protein in the whole oil seed as described above, may be utilized.

The comminuted oil seed, nonvaporous aldehyde and/or nonvaporous activating agent and/or vaporous activating agent and/or vaporous aldehyde passing through feeder conduit 24 enters extruder 14. The particulate matter is picked up by the screw sections of rear auger section 46a and moved by the coaction of the screw section and grooves 40 forwardly toward steam lock assembly 48. During this forward movement, the particulate matter travels transversely about ½ inch for every two turns of the auger. As the forward movement of the particulate matter progresses, the matter is ground, compressed, further admixed and frictionally heated. The particulate matter remains in the rear housing section 34a until sufficiently compressed for passage through steam lock assembly 48 between the innerperipheral surface of sleeve 60 and the land portion 52 of ring member 50. The particulate mixture on being forced through the steam lock assembly 48 is then picked up by the screw sections 46b and further compressed, admixed, ground and frictionally heated while concurrently being moved forwardly toward steam lock assembly 62. The particulate matter is maintained within intermediate housing section 34b until sufficiently compressed to pass between the corresponding sleeve and land section of steam lock assembly 62. The steam lock assemblies 48 and 62 constitute circumferentially extended restrictive passages which provide a means for applying a pressure on the particulate matter as it is forwardly moved by the screw sections of intermediate auger section 46b.

The particulate matter on passing steam lock assembly 62 is picked up by front section 46c of auger 46 and further compressed, ground and frictionally heated while concurrently being moved toward adjustable passage 78 for discharge into the atmosphere through discharge bore 74 and outlet 30.

Each housing section 34a, 34b and 34c act as a series of compression chambers so that compressive pressure applied to the product material is progressively increased as the material travels through housing 34. The compressive pressure applied to the product material in the rear compression chamber formed by rear housing section 34a, is determined by the clearance relation between land 52 and sleeve 60; the pressure in the intermediate compression chamber formed by intermediate housing section 34b is determined by the clearance relation between land 52 and associated sleeve 60 of steam lock assembly 48 and the like land and sleeve similarly associated with steam lock assembly 62 in cooperation. The pressure in the front chamber formed by front housing section 34c is determined by the adjustable position of the transversely expandable and contractable passage 78. The various openings and adjustable passages are set such that the pressure is about 5 psig at the face of steam lock assembly 48 and about 50 psig within the adjustable passage 78. Additionally, as the material is frictionally ground in each of the chambers, there exists a corresponding temperature increase within that chamber such that a particulate matter being at ambient temperature upon entering the extruder is heated by friction and pressure. The Temperature reached in each of the chambers will be a function of the frictional heat generated within and the pressure exerted upon the material within the chamber.

Additionally, as previously stated, the innerperipheral surface of the housing 34 is formed with axially extending grooves 40. As the particulate material travels through housing 34, it is reduced by grinding to various sizes by the action of the auger 46. The material, which is not sufficiently compressed to be moved through a particular steam lock (48 or 62) or adjustable passage 78, is retained within the respective housing section and travels in grooves 40 in a counter-current direction for return into the screw section of auger 46 for additional size reducing action.

Thus, the particulate matter entering the extruder traverses forwardly along the auger being sufficiently compressed and ground to pass through each successive steam lock and finally, the adjustable passage. As the particulate matter moves through the extruder, material which is sufficiently compressed is caused to flow counter-currently such that the auger may again pick up the material within a given section and further compress and comminute it to be a size sufficient to pass through a given steam lock assembly or the adjustable passage. As the particulate matter travels forwardly through each successive steam lock and finally, the adjustable passage, it is subjected to progressively increasing pressure and frictionally heated until the feed material having lipid globules thoroughly dispersed within a protein material which has been reacted with an aldehyde after first being activated with an activating agent to form a protective protein-aldehyde complex, is extruded in an agglomerated form through outlet 30 and broken into chunks by gravitational forces to form a pelletized feed supplement for ruminants.

This invention can be more easily understood from a study of the following examples which are given for illustrative purposes only.

EXAMPLE 1

In this example, an agglomerated feed supplement containing lipids within a protective protein-aldehyde complex is produced utilizing the technique and apparatus described above. The oil seed consisting of a mixture of 35 lbs. raw whole sunflower seed and 15 lbs. soybeans which in combination, contain 24.8% by weight protein and 14% by weight moisture, was admixed with 1 lb. sodium hydroxide and 1 lb. paraformaldehyde in a mixer for 10 minutes. The mixture was then comminuted in a hammer mill and run through a sieve with a 3/32 inch screen. The comminuted mixture of uniform particulate size was then run through the extruder. The average temperature in the extruder was about 150°F.

Samples of the agglomerated product and samples of unreacted comminuted seed used as a control group were then separately incubated anaerobically at 38°C. with strained rumen fluid obtained from a sheep which had been fasted for at least 12 hours. The degree of hydrogenation was determined by comparing the percentage weight of linoleic acid present in the respective mixtures before and after incubation. The resistance level of the control group as 18% while the resistance of the agglomerated product was 68%.

The above in vitro test clearly indicates that comminuted seed which was not treated in accordance with the invention, underwent significantly more hydrogenation in the rumen juice than did the same comminuted seed treated in accordance with the instant invention.

EXAMPLE 2

In this example, the agglomerated feed supplement containing lipids within a protective protein-aldehyde complex was produced utilizing the technique and apparatus as in Example 1. Using the oil seed mixture of Example 1, that is, 35 lbs. raw whole sunflower seed and 15 lbs. soybeans which in combination, contain 24.8% by weight protein and 14% by weight moisture, eight separate runs were made. In each run, the amount and type of activating agent and/or aldehyde was varied as described below. Additionally, the average temperature the comminuted mixture attained during the process was recorded.

The product obtained from each of these runs was subjected to in vitro testing as described in Example 1.

| Run 1 | |
|---|---|
| paraformaldehyde | 1.00 lb. |
| prilled urea | 1.00 lb. |
| average temperature | 150°F. |
| resistance in vitro | 84.3% |
| Run 2 | |
| paraformaldehyde | 1.00 lb. |
| prilled urea | 1.00 lb. |
| average temperature | 250°F. |
| resistance in vitro | 75.6% |
| Run 3 | |
| paraformaldehyde | 1.5 lbs. |
| prilled urea | 1.5 lbs. |
| average temperature | 250°F. |
| resistance in vitro | 84% |
| Run 4 | |
| paraformaldehyde | 1.50 lbs. |
| anhydrous ammonia | 1.50 lbs. at 25 psi |
| average temperature | 200°F. |
| resistance in vitro | 89% |
| Run 5 | |
| paraformaldehyde | 1.00 lbs. |
| anhydrous ammonia | 1.00 lbs. at 25 psi |
| average temperature | 175°F. |
| resistance in vitro | 78.7% |
| Run 6 | |
| paraformaldehyde | 1.75 lbs. |
| anhydrous ammonia | 1.00 lbs. at 25 psi |
| average temperature | 212°F. |
| resistance in vitro | 66.3% |
| Run 7 | |
| paraformaldehyde | 0.75 lbs. |
| prilled urea | 0.50 lbs. |
| anhydrous ammonia | 0.50 lbs. at 25 psi |
| average temperature | 141°F. |
| resistance in vitro | 86% |
| Run 8 | |
| paraformaldehyde | 1.25 lbs. |
| sodium hydroxide | 0.625 lbs. |
| prilled urea | 0.625 lbs. |
| average temperature | 150°F. |
| resistance in vitro | 85.5% |
| Run 9 | |
| paraformaldehyde | 0.50 lbs. |
| sodium hydroxide | 100 lbs. |
| average temperature | 106°F. |
| resistance in vitro | 83.3% |
| Run 10 | |
| paraformaldehyde | 1.00 lbs. |
| sodium hydroxide | 1.00 lbs. |
| average temperature | 106°F. |
| resistance in vitro | 60.1% |

This example shows that comminuted seed treated with various activating agents and paraformaldehyde in varying proportions in accordance with the invention, provide in vitro resistance which is significantly greater than the in vitro resistance of comminuted seed without such treatment.

EXAMPLE 3

In this example, the agglomerated feed supplement containing lipids within a protective protein-aldehyde complex was produced utilizing the technique and apparatus as in Example 1. An oil seed mixture of 25 lbs. raw, whole sunflower seed and 25 lbs. soybean, which in combination contain 28% by weight protein and 14% by weight moisture, were admixed with 1 lb. paraformaldehyde. The average temperature in the extruder was 250°F. and the in vitro resistance of the product was 74.1%.

This example shows that increasing the percent of protein in the mixture did not deleteriously affect the in vitro resistance level.

EXAMPLE 4

In this example, the agglomerated feed supplement containing lipids within a protective protein-aldehyde complex was produced utilizing the technique and apparatus as in Example 1. Using an oil seed mixture of corn, whole oil sunflower seed and soybeans, two runs were made utilizing 1 lb. paraformaldehyde and 1 lb. prilled urea as described below. The average temperature which the comminuted mixture attained during the process was recorded.

| Run 1 | |
|---|---|
| corn | 10 lbs. |
| sunflower seed | 20 lbs. |
| soybeans | 20 lbs. |
| total protein | 24.4% |
| average temperature | 250°F. |
| resistance in vitro | 59% |
| Run 2 | |
| corn | 17.5 lbs. |
| soybeans | 17.5 lbs. |
| sunflower seed | 15 lbs. |
| total protein | 22.1% |
| resistance in vitro | 59% |

EXAMPLE 5

In this example, the agglomerated feed supplement containing lipids within a protective protein aldehyde complex produced in accordance with the invention, was tested for in vivo resistance by feeding a 1,100 pound black angus range cow, 6 years of age a selective diet of various feed supplements produced as previously described in Examples 1–4 herein.

In this test, the ruminant animal whose lactation period began Mar. 3, 1973 and ended Dec. 20, 1973 was maintained on a diet of 28 pounds of hay per day. The animal was milked each day at 8:00 a.m. prior to daily feeding.

In accordance with this example, four sets of tests were run, the results of which are shown in the tables below. The tests were conducted as follows: Prior to ingestion of the supplement a "base line" butter fat content of the milk was determined by chemical assay. The test diet containing the supplement was then administered. The test diet was fed each successive day throughout the test and the animal was milked as usual. The milk butter fat content was determined by chemical assay on selected days during the test period. The test diet was then terminated and the normal diet resumed.

A second test period was commenced using the same animal not less than 10 days from the termination of a preceding period to allow the butter fat content to again normalize. This sequence was continued until all 4 test periods were completed.

The feed supplements used in accordance with this example were those of various "runs" as described in the previous examples herein. The particular feed supplement utilized in this example will therefore be labeled according to the previous example and run wherein the composition was fully described. All percentages of butter fat are given in weight percent of butter fat to total weight of milk.

TABLE I

Diet: 6 lbs. of Feed Supplement
of Example 2, Run 2; and
22 lbs. Hay

| Period on Diet (days) | % Butterfat |
| --- | --- |
| 0 | 3.5% (base line) |
| 2 | 4.5% |

TABLE II

Diet: 6 lbs. of Feed Supplement
of Example 2, Run 6; and
22 lbs. Hay

| Period on Diet (days) | % Butterfat |
| --- | --- |
| 0 | 3.7% (base line) |
| 1 | 4.9% |
| 2 | 5.6% |
| 3 | 7.1% |

TABLE III

Diet: 5 lbs. of Feed Supplement
of Example 2, Run 1; and
23 lbs. Hay

| Period on Diet (days) | % Butterfat |
| --- | --- |
| 0 | 3.6% base line |
| 1 | 5.0% |
| 4 | 5.9% |
| 7 | 6.8% |

TABLE IV

Diet: 5 lbs. of Feed Supplement
of Example 2, Run 9; and
23 lbs. Hay

| Period on Diet (days) | % Butterfat |
| --- | --- |
| 0 | 3.3% (base line) |
| 2 | 5.0% |
| 4 | 6.3% |
| 6 | 6.7% |

This example shows that feeding a ruminant, specifically a cow, the feed supplement produced in accordance with the instant invention significantly increases butter fat content of the milk of that animal.

EXAMPLE 6

In this example, the agglomerated feed supplement containing lipids within a protective protein aldehyde complex produced in accordance with the invention was tested for in vivo resistance by feeding a 66 pound lactating goat, 4 years of age, a selective diet of various feed supplements produced as previously described in Examples 1–4 herein.

In this test, the ruminant animal was maintained on a nonsupplement-containing diet of 8 pounds of hay per day. The animal was milked each day at 8:00 a.m. prior to daily feeding.

In accordance with this example, six sets of tests were run, the results of which are shown in the tables below. The tests were conducted as in Example 5.

The feed supplement used in accordance with this example are those of various "runs" as described in the previous examples herein. In particular, feed supplements utilized in this example will therefore be labeled according to the previous example and run wherein the composition was fully described.

TABLE I

Diet: First Day 1.5 lbs. of Feed
Supplement of Example 4,
Run 1; and 6.5 lbs. Hay on
all subsequent days; 2.0 lbs.
of Feed Supplement of Example
4, Run 1; and 6 lbs. Hay

| Period on Diet (days) | % Butterfat |
| --- | --- |
| 0 | 3.9% (base line) |
| 1 | 4.1% |
| 2 | 4.3% |
| 3 | 4.7% |

TABLE II

Diet: 3 lbs. of Feed Supplement
of Example 4, Run 2; and
5 lbs. Hay

| Period on Diet (days) | % Butterfat |
| --- | --- |
| 0 | 4.1% (base line) |
| 4 | 6.9% |

TABLE III

Diet: 2 lbs. of Feed Supplement of
Example 2, Run 5; and 6 lbs.
Hay

| Period on Diet (days) | % Butterfat |
| --- | --- |
| 0 | 4.3% (base line) |
| 1 | 5.0% |
| 2 | 5.9% |
| 3 | 6.9% |

TABLE IV

Diet: 2 lbs. of Feed Supplement of
Example 2, Run 10; and 6 lbs.
Hay

| Period on Diet (days) | % Butterfat |
| --- | --- |
| 0 | 4.2% (base line) |
| 1 | 4.8% |
| 2 | 6.3% |

TABLE V

Diet: 2 lbs. of Feed Supplement of
Example 2, Run 5; and 6 lbs. Hay

| Period on Diet (days) | % Butterfat |
| --- | --- |
| 0 | 4.2% (base line) |
| 1 | 5.4% |

This example shows that feeding a ruminant, specifically a goat, a diet containing the feed supplement produced in accordance with the instant invention significantly increases the butter fat content of the milk of that animal.

EXAMPLE 7

In this example, the linoleic acid content of an animal fed the supplement in accordance with this invention was tested for in vivo resistance to hydrogenation. Specifically, the butterfat in the milk of the animal tested in Example 5 was assayed to determine the linoleic acid content thereof. The tests in this example were carried out exactly as described in Example 5. Additionally, the percent of linoleic acid present was determined. The diets fed and the period of tests in this example correspond to that of Table I and Table IV in Example 5, respectively. The results of these tests are shown in the tables below. Percents of linoleic acid are by weight of linolenic acid to weight of total fat content.

TABLE I

Diet: 6 lbs. of Feed Supplement of Example 2, Run 2; and 22 lbs. Hay

| Period on Diet (days) | % Butterfat | % Linoleic Acid |
| --- | --- | --- |
| 0 | 3.5% (base line) | 2.1% |
| 2 | 4.5% | 6.7% |

TABLE II

Diet: 5 lbs. of Feed Supplement of Example 2, Run 9; and 23 lbs. Hay

| Period on Diet (days) | % Butterfat | % Linoleic Acid |
| --- | --- | --- |
| 0 | 3.3% (base line) | 2.3% |
| 6 | 5.7% | 14.7% |

As can be seen by the results in this example, a ruminant, and specifically a cow, fed the supplement produced in accordance with the instant invention, shows a marked increase in the amount linolenic acid present in the butterfat content over the same animal prior to being fed the supplement.

EXAMPLE 8

In this example as in Example 7, the linoleic acid content of an animal fed the supplement in accordance with this invention was tested for in vivo resistance to hydrogenation. Specifically, the butterfat in the milk of the animal tested in Example 6 was assayed to determine the linoleic acid content thereof. The tests in this example were carried out exactly as described in Example 6. Additionally, the percent of linoleic acid present was determined. The diets fed and the period of tests in this example correspond to that of Table I and Table IV in Example 6, respectively. Percents are by weight. The results of these tests are shown in the tables below.

TABLE I

Diet: (First day) 1.5 lbs. Feed Supplement of Example 4, Run 1; and 6.5 lbs. Hay (On all subsequent days) 2.0 lbs. Feed Supplement of Example 4, Run 1; and 6 lbs. Hay

| Period on Diet (days) | % Butterfat | % Linoleic Acid |
| --- | --- | --- |
| 0 | 3.9% (base line) | 4.1% |

TABLE I-continued

Diet: (First day) 1.5 lbs. Feed Supplement of Example 4, Run 1; and 6.5 lbs. Hay (On all subsequent days) 2.0 lbs. Feed Supplement of Example 4, Run 1; and 6 lbs. Hay

| Period on Diet (days) | % Butterfat | % Linoleic Acid |
| --- | --- | --- |
| 3 | 4.7% | 10.8% |

TABLE II

Diet: 2 lbs. Feed Supplement of Example 2, Run 10; and 6 lbs. Hay

| Period on Diet (days) | % Butterfat | % Linoleic Acid |
| --- | --- | --- |
| 0 | 4.2% (base line) | 4.6% |
| 2 | 6.3% | 6.8% |

As can be seen by the results in this example, ruminants, and specifically a goat, fed the feed supplement produced in accordance with the instant invention, showed a marked increase in the amount of unsaturated, linoleic acid in the butterfat content over the same animal prior to being fed the supplement.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. A method of producing a feed supplement for ruminants containing lipids dispersed within a protective proteinaldehyde complex which is substantially insoluble in the rumen but soluble in the abomasum and lower gut of a ruminant which comprises:
   a. forming a lipid-protein material mixture;
   b. finely comminuting and further admixing said mixture by compressing and grinding said mixture to form a protein material with lipid globules thoroughly dispersed therein at a temperature within about 75°F to about 250°F and at sufficient pressures to prevent escape of volatile components therefrom; and
   c. contacting said mixture during said compressing and grinding with an effective amount of an activating agent to activate the protein material and with an effective amount of an aldehyde to form a protective protein-aldehyde complex around said lipid globules.

2. The method of claim 1 wherein the weight ratio of lipid to protein material in said mixture is in the range from about 0.5:1 to about 5:1.

3. The method of claim 2 wherein from about 5% to about 9% by weight per total weight of protein in the protein material-lipid mixture of said aldehyde is contacted with said mixture.

4. The method of claim 3 wherein said aldehyde is selected from a group consisting of paraformaldehyde, glutaraldehyde, glyoxal and formaldehyde.

5. The method of claim 4 wherein from about 1% to about 6% by weight per total weight of the protein material-lipid mixture of said activating agent is contacted with said mixture.

6. The method of claim 5 wherein said activating agent is selected from alkali metal hydroxides, ammonium hydroxides, urea and ammonia.

7. The method of claim 6 wherein said pressure is about from 5 psig to about 50 psig.

8. The method of claim 7 wherein said lipid-protein material mixture is comminuted oil seeds selected from soybean, peanut, sunflower, safflower, cotton, maize and rape.

9. The method of claim 8 wherein (b) is accomplished by augering said lipid-protein material mixture in an extruder.

10. A method of producing solid particulate feed supplement for ruminants containing dispersed lipids within a protein-aldehyde complex which is substantially insoluble in the rumen but soluble in the abomasum and lower gut of said ruminants comprising:
  a. forming a mixture of a feed material comprising lipid and protein;
  b. comminuting said mixture and constantly admixing the comminuted mixture by augering said mixture in an extruder at a temperature within the range of from about 75°F to about 250°F and at a pressure in the range of from about 5 psig to about 50 psig to form a protein material with lipid globules thoroughly dispersed therein; and
  c. contacting said mixture during said augering with an effective amount of an activating agent to activate the protein material and with an effective amount of an aldehyde to react with said protein and form a protein-aldehyde complex around said lipid globules therein; and
  d. agglomerating and cooling the resulting mixture from step (c) to form said particulate feed supplement.

11. The method of claim 10 wherein the weight ratio of lipid to protein material in said mixture is in the range from about 0.5:1 to about 5:1.

12. The method of claim 11 wherein from about 5% to about 9% by weight per total weight of protein in the protein material-lipid mixture of said aldehyde is contacted with said mixture.

13. The method of claim 12 wherein said aldehyde is selected from a group consisting of paraformaldehyde, glutaraldehyde, glyoxal and formaldehyde.

14. The method of claim 13 wherein from about 1% to about 6% by weight per total weight of the protein material-lipid mixture of said activating agent is contacted with said mixture.

15. The method of claim 14 wherein said activiating agent is selected from alkali metal hydroxides, ammonium hydroxides, urea and ammonia.

16. The method of claim 15 wherein said lipid-protein material mixture is comminuted oil seeds selected from soybean, peanut, sunflower, safflower, cotton, maize and rape.

* * * * *

PO-1050
(5/69)

UNITED STATES PATENT OFFICE
CERTIFICATE OF CORRECTION

Patent No. 3,966,998    Dated June 29, 1976

Inventor(s) Robert W. Rawlings and Anthony Ambrose Maher

It is certified that error appears in the above-identified patent and that said Letters Patent are hereby corrected as shown below:

Column 1, line 60, "proteinaldehyde" should be --protein-aldehyde--.
Column 2, line 8, "abomasium" should be --abomasum--;
    line 16, "proteinaldehyde" should be --protein-aldehyde--.

Column 5, line 52, "if" should be --it--.
Column 10, line 58, "68%" should be --66%--.
Colume 13, line 34 (Table III), "base line)" should be
    --(base line)--.

Signed and Sealed this

Fifth Day of October 1976

[SEAL]

Attest:

RUTH C. MASON
Attesting Officer

C. MARSHALL DANN
Commissioner of Patents and Trademarks